US012646460B2

(12) United States Patent
Yu et al.

(10) Patent No.: US 12,646,460 B2
(45) Date of Patent: Jun. 2, 2026

(54) PIXEL CIRCUIT AND DISPLAY DEVICE

(71) Applicant: Qisda Corporation, Taoyuan City (TW)

(72) Inventors: Chao-Shun Yu, Taoyuan City (TW); Wen-Chang Chen, Taoyuan City (TW); Chun-Sheng Hu, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 12 days.

(21) Appl. No.: 18/914,293

(22) Filed: Oct. 14, 2024

(65) Prior Publication Data

US 2025/0140189 A1 May 1, 2025

(30) Foreign Application Priority Data

Oct. 27, 2023 (TW) ................................ 112141274

(51) Int. Cl.
*G09G 3/32* (2016.01)
*G09G 3/3233* (2016.01)

(52) U.S. Cl.
CPC ............ *G09G 3/3233* (2013.01); *G09G 3/32* (2013.01); *G09G 2300/0809* (2013.01); *G09G 2320/0626* (2013.01); *G09G 2360/144* (2013.01)

(58) Field of Classification Search
CPC .................. G09G 3/3233; G09G 3/32; G09G 2300/0809; G09G 2320/0626; G09G 2360/144; G09G 3/36; G06F 3/041
See application file for complete search history.

(56) References Cited

U.S. PATENT DOCUMENTS

| | | | | |
|---|---|---|---|---|
| 8,514,165 B2 | 8/2013 | Yoshida | | |
| 9,142,179 B2 | 9/2015 | Kimura et al. | | |
| 2008/0158137 A1* | 7/2008 | Yoshida | G09G 3/3648 | 250/214 A |
| 2011/0309238 A1* | 12/2011 | Tian | H10F 39/813 | 250/214 R |

FOREIGN PATENT DOCUMENTS

| | | |
|---|---|---|
| CN | 103903383 | 6/2016 |
| CN | 209218059 | 8/2019 |
| CN | 111427470 | 7/2023 |
| TW | I358570 | 2/2012 |
| TW | I543607 | 7/2016 |
| TW | I703372 | 9/2020 |
| TW | I728577 | 5/2021 |
| TW | 202244884 | 11/2022 |

* cited by examiner

*Primary Examiner* — Michael A Faragalla
(74) *Attorney, Agent, or Firm* — JCIPRNET

(57) ABSTRACT

A pixel circuit and a display device are provided. The pixel circuit includes a light-emitting component, a first light sensor, and a variable resistor. The first light sensor receives a first operation voltage, and provides a first control voltage according to an intensity of a first sensed light. The variable resistor adjusts a resistance value provided therefrom according to the first control voltage so as to adjust a current value of a driving current flowing through the light-emitting component.

15 Claims, 5 Drawing Sheets

200

PIXEL CIRCUIT AND DISPLAY DEVICE

CROSS-REFERENCE TO RELATED APPLICATION

This application claims the priority benefit of Taiwan application serial no. 112141274, filed on Oct. 27, 2023. The entirety of the above-mentioned patent application is hereby incorporated by reference herein and made a part of this specification.

BACKGROUND

Technical Field

The disclosure relates to a pixel circuit, and particularly relates to a pixel circuit that can be dynamically adjusted according to a state of ambient light.

Description of Related Art

In today's technical field, current light-emitting diode display devices, such as direct-view light-emitting diode display devices, can be used in various fields, including indoors and outdoors. However, under such application conditions, the display effect of the display device is easily affected by ambient light indoors and outdoors such that the display quality of the display image is affected as a result of the ambient light (light, reflection, or sunlight).

SUMMARY

The disclosure provides a pixel circuit and a display device that can reduce the interference on the display effect caused by different states of ambient light so as to maintain the display quality.

A pixel circuit of the disclosure includes a light-emitting component, a first light sensor, and a variable resistor. The first light sensor receives a first operation voltage and provides a first control voltage according to an intensity of a first sensed light. The variable resistor and the light-emitting component are coupled in series between a second operation voltage and a reference voltage. The variable resistor adjusts a resistance value provided therefrom according to the first control voltage so as to adjust a current value of a driving current flowing through the light-emitting component.

A display device of the disclosure includes a plurality of pixel circuits as described above. The pixel circuits are arranged in an array and configured to provide a display image.

Based on the above, the pixel circuit of the disclosure generates the control voltage through the light sensor according to the state of the sensed light. Then, through the variable resistor, the resistance value provided therefrom is adjusted according to the control voltage, and the current value of the driving current flowing through the light-emitting component is further adjusted. In this way, the light emission brightness of the light-emitting component can be dynamically adjusted according to the state of the sensed light, thereby reducing the interference of the sensing light to maintain the display performance of the generated image.

DESCRIPTION OF THE EMBODIMENTS

Figure 1:
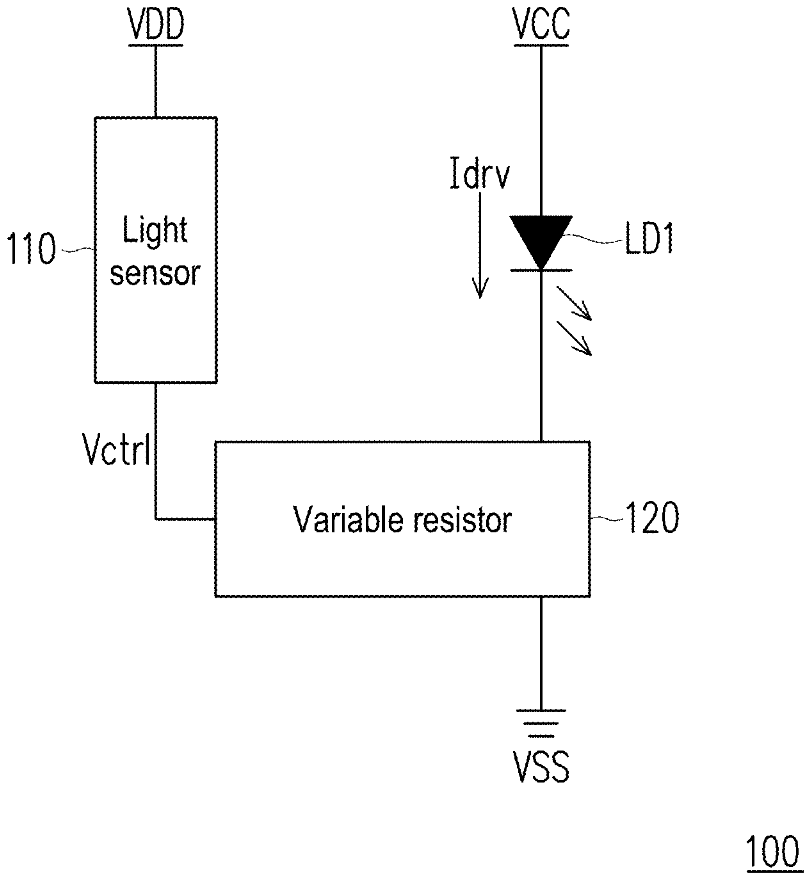
FIG. 1 is a schematic diagram of a pixel circuit according to an embodiment of the disclosure.

Referring to FIG. 1, FIG. 1 is a schematic diagram of a pixel circuit according to an embodiment of the disclosure. A pixel circuit 100 includes a light sensor 110, a variable resistor 120, and a light-emitting component LD1. The light sensor 110 receives an operation voltage VDD and is coupled to the variable resistor 120. The variable resistor 120 and the light-emitting component LD1 are coupled in series with each other between an operation voltage VCC and a reference voltage VSS. The light sensor 110 generates a control voltage Vctrl according to an intensity of a sensed light, and provides the control voltage Vctrl to the variable resistor 120. The variable resistor 120 can adjust a resistance value provided therefrom according to the control voltage Vctrl. By adjusting the resistance value provided by the variable resistor 120, a current value of a driving current Idrv flowing through the light-emitting component LD1 can be adjusted accordingly. In this way, the light emission brightness of the light-emitting component LD1 can also be adjusted accordingly.

In detail, when the intensity of the sensed light is greater than a preset first threshold value, the light sensor 110 can adjust a voltage value of the control voltage Vctrl according to the operation voltage VDD, for example, by pulling up the voltage value of the control voltage Vctrl to a first voltage value. Correspondingly, the variable resistor 120 can decrease the resistance value provided therefrom corresponding to the pulled-up control voltage Vctrl. In this way, the current value of the driving current Idrv flowing through the light-emitting component LD1 can be increased, and the light emission brightness of the light-emitting component LD1 can be increased accordingly. In contrast, when the intensity of the sensed light is less than a preset second threshold value, the light sensor 110 can, for example, pull down the voltage value of the control voltage Vctrl to a second voltage value according to the operation voltage VDD. Correspondingly, the variable resistor 120 can increase the resistance value provided therefrom corresponding to the pulled-down control voltage Vctrl. In this way, the current value of the driving current Idrv flowing through the light-emitting component LD1 can be decreased, and the light emission brightness of the light-emitting component LD1 can be decreased accordingly. The first threshold value may be greater than or equal to the second threshold value.

Incidentally, in the embodiment, the operation voltage VDD received by the light sensor 110 and the operation voltage VCC received by the light-emitting component LD1 may be equal or unequal, which should however not be construed as a limitation in the disclosure. The reference voltage VSS in the embodiment may be the ground voltage.

In addition, the coupling sequence between the light-emitting component LD1 and the variable resistor 120 in FIG. 1 can also be exchanged with each other. The illustration in FIG. 1 is only an example for illustration and is not intended to limit the scope of the disclosure.

The light-emitting component LD1 in the embodiment can be any form of light-emitting diode, such as a direct-view light-emitting diode (dvLED), a micro light-emitting diode (micro LED), an organic LED (OLED), etc., which should however not be construed as a limitation in the disclosure.

Incidentally, the light sensor 110 can be configured to sense the brightness of the sensed light that is white light, or can also be configured to sense the brightness of the sensed light with a specific wavelength, such as red light, blue light, or green light.

Figure 2:
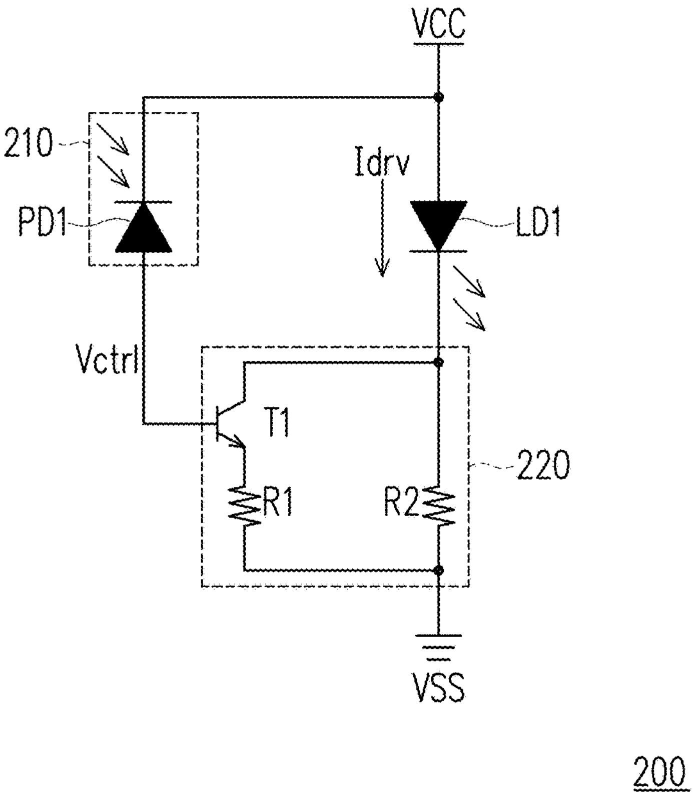
FIG. 2 is a schematic diagram of a pixel circuit according to another embodiment of the disclosure.

Referring to FIG. 2 below, FIG. 2 is a schematic diagram of a pixel circuit according to another embodiment of the disclosure. A pixel circuit 200 includes a light sensor 210, a variable resistor 220, and the light-emitting component LD1. In the embodiment, the light sensor 210 may be a photo diode PD1. An anode of the photo diode PD1 can be coupled to the variable resistor 220 and configured to provide the control voltage Vctrl, and a cathode of the photo diode PD1 can receive the operation voltage VCC. In addition, the light-emitting component LD1 may be a light-emitting diode. An anode of the light-emitting component LD1 can receive the operation voltage VCC, and a cathode of the light-emitting component LD1 can be coupled to the variable resistor 220.

On the other hand, the variable resistor 220 includes a transistor T1 and resistors R1 and R2. The resistor R2 is connected in series between the cathode of the light-emitting component LD1 and the reference voltage VSS. The transistor T1 and the resistor R1 are connected in series with each other between the cathode of the light-emitting component LD1 and the reference voltage VSS, and are coupled in parallel with the resistor R2. A control terminal of the transistor T1 is coupled to the cathode of the photo diode PD1 to receive the control voltage Vctrl.

In terms of action details, the degree to which the photo diode PD1 is turned on can be adjusted according to the intensity of the sensed light received. When the intensity of the sensed light is less than the second threshold value, the photo diode PD1 can be completely turned off. At this time, the control voltage Vctrl cannot turn on the transistor T1 such that the transistor T1 is in the off state. At the same time, the resistance value provided by the variable resistor 220 is equal to the resistance value of the resistor R2, and the driving current Idrv flowing through the light-emitting component LD1 can be equal to the operation voltage VCC divided by the resistance value of the resistor R2.

When the intensity of the sensed light is increased and is greater than the preset first threshold value, the photo diode PD1 can be fully turned on, so that the control voltage Vctrl can be substantially equal to the operation voltage VCC (the photo diode PD1 still has a small on-resistance). At the same time, the transistor T1 can be fully turned on according to the control voltage Vctrl. In this way, the variable resistor 220 can provide a resistance value R1/R2 of the resistors R1 and R2 connected in parallel with each other. The resistance value R1/R2 is less than the resistance value of the resistor R2. In this way, the driving current Idrv flowing through the light-emitting component LD1 can be increased to be equal to the operation voltage VCC divided by the resistance value R1/R2, thereby increasing the light emission brightness of the light-emitting component LD1.

It can be known from the above description that the pixel circuit 200 provided in the embodiment of the disclosure can dynamically and appropriately adjust the light emission brightness of the light-emitting component LD1 according to the intensity of the sensed light, which can effectively reduce the interference of ambient light on the display brightness of the pixel circuit 200 to maintain display quality.

In the embodiment, the light-emitting component LD1 and the photo diode PD1 receive the same operation voltage VCC. In other embodiments of the disclosure, the light-emitting component LD1 and the photo diode PD1 may also receive different operation voltages. In the variable resistor 220, the transistor T1 can be a bipolar transistor or any other type of transistor, which should however not be construed as a limitation in the disclosure. Moreover, the positions of the transistor T1 and the resistor R1 in FIG. 2 can also be exchanged with each other, which should however not be construed as a limitation in the disclosure.

Figure 3:
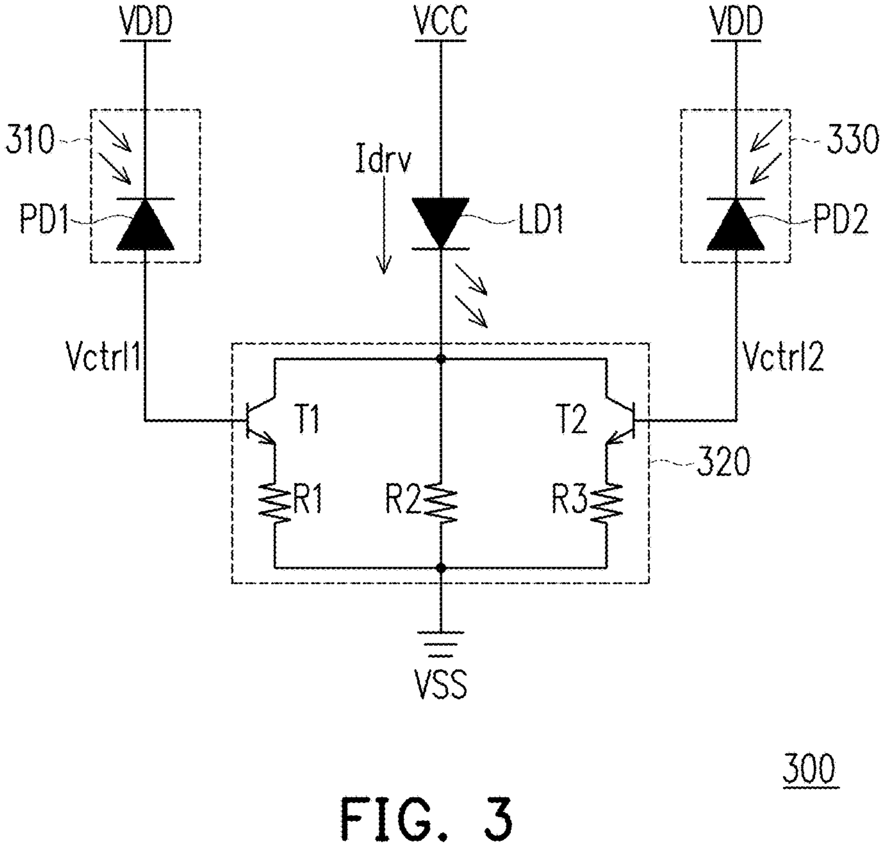
FIG. 3 is a schematic diagram of a pixel circuit according to another embodiment of the disclosure.

Referring to FIG. 3, FIG. 3 is a schematic diagram of a pixel circuit according to another embodiment of the disclosure. A pixel circuit 300 includes light sensors 310 and 330, a variable resistor 320, and the light-emitting component LD1. Different from the previous embodiments, in the embodiment, the pixel circuit 300 has a plurality of light sensors 310 and 330. The light sensors 310 and 330 respectively include photo diodes PD1 and PD2 and receive the operation voltage VDD. The light-emitting component LD1 receives the operation voltage VCC. In addition, the variable resistor 320 includes the resistor R2, the transistor T1 and the resistor R1 corresponding to the light sensor 310, and a transistor T2 and a resistor R3 corresponding to the light sensor 330. The transistor T1 and the resistor R1 are coupled in series with each other between the cathode of the light-emitting component LD1 and the reference voltage VSS; the transistor T2 and the resistor R3 are coupled in series with each other between the cathode of the light-emitting component LD1 and the reference voltage VSS; and the resistor R2 is also coupled between the cathode of the light-emitting component LD1 and the reference voltage VSS.

The light sensors 310 and 330 respectively provide control voltages Vctrl1 and Vctrl2 according to the intensity of the sensed light. The transistors T1 and T2 are turned on or off according to the control voltages Vctrl1 and Vctrl2 respectively. When the transistors T1 and T2 are both turned off, the variable resistor 320 can provide the maximum resistance value (equal to the resistance value of the resistor R2). When one of the transistors T1 and T2 is turned off and the other one is turned on, the variable resistor 320 can provide the next largest resistance value (equal to the resistance value of the resistor R2 connected in parallel with one of the resistors R1 and R3). When the transistors T1 and T2 are both turned on, the variable resistor 320 can provide a minimum resistance value (equal to the resistance value of the resistors R2, R1, and R3 connected in parallel with each other).

Correspondingly, when the variable resistor 320 provides the maximum resistance value, the driving current Idrv passing through the light-emitting component LD1 has the lowest current value, and the light-emitting component LD1 emits the lowest brightness. When the variable resistor 320 provides the second largest resistance value, the driving current Idrv passing through the light-emitting component LD1 has the second lowest current value, and the light-emitting component LD1 emits the second lowest brightness. When the variable resistor 320 provides the minimum resistance value, the driving current Idrv passing through the light-emitting component LD1 has the largest current value, and the light-emitting component LD1 emits the highest brightness.

In the first implementation of the embodiment, the light sensors 310 and 330 can sense the same sensed light. The light sensor 310 can be turned on when the intensity of the sensed light is greater than the preset first threshold value, and the light sensor 330 can be turned on only when the intensity of the sensed light is greater than the preset second threshold value. The second threshold value is greater than the first threshold value. That is to say, in the first implementation of the embodiment, when the intensity of the sensed light is less than the first threshold value, all the light sensors 310 and 330 are not turned on, and the transistors T1 and T2 are turned off., so that the light-emitting component LD1 is configured to provide the lowest brightness. When the intensity of the sensed light is greater than the first threshold value but less than the second threshold value, all the light sensors 310 can be turned on, the light sensor 330 is not turned on, the transistor T1 is turned on, and the transistor T2 is turned off, so that the light-emitting component LD1 is configured to provide the second lowest brightness. When the intensity of the sensed light is greater than the second threshold value, all the light sensors 310 and 330 can be turned on, the transistors T1 and T2 are both turned on, so that the light-emitting component LD1 can be configured to provide the highest brightness.

It can be known from the above description that in the embodiment, the plurality of light sensors 310 and 330 are disposed to increase the level of brightness of the sensed light that can be sensed. The brightness provided by the light-emitting component LD1 can be adjusted in a plurality of stages through the plurality of transistors T1 and T2 and the corresponding plurality of resistors R1 and R3 according to the intensity of the sensed light, thereby improving the working performance of the pixel circuit 300.

On the other hand, in the second implementation of the embodiment, the light sensors 310 and 330 may sense different sensed lights with different wavelengths. The light sensor 310 can be configured to sense a first sensed light with a first wavelength, and the light sensor 330 can be configured to sense a second sensed light with a second wavelength. The first wavelength and second wavelength are different.

In the second embodiment, the light sensor 310 further includes a first color filter. The first color filter is disposed between paths through which the photo diode PD1 receives ambient light. The light sensor 330 further includes a second color filter. The second color filter is disposed between paths through which the photo diode PD2 receives ambient light. The first color filter is configured to generate the first sensed light through the first wavelength part of the ambient light. The light sensor 310 can generate the control voltage Vctrl1 according to the intensity of the first sensed light. The second color filter is configured to generate the second sensed light through the second wavelength part of the ambient light. The light sensor 330 can generate the control voltage Vctrl2 according to the intensity of the second sensed light.

The arrangement of the color filter and the corresponding light sensor will be described in detail in later embodiments.

In the second embodiment, when the intensity of the first sensed light of the first wavelength is greater than the first threshold value, the light sensor 310 may generate the control voltage Vctrl1 that is substantially equal to the operation voltage VDD, so that the transistor T1 is turned on. The resistance value provided by the variable resistor 320 can be decreased by turning on the transistor T1, thereby increasing the brightness generated by the light-emitting component LD1. In addition, when the intensity of the second sensed light of the second wavelength is greater than the second threshold value, the light sensor 320 may generate the control voltage Vctrl2 that is substantially equal to the operation voltage VDD, so that the transistor T2 is turned on. The resistance value provided by the variable resistor 320 can also be decreased by turning on the transistor T2, thereby increasing the brightness generated by the light-emitting component LD1. It is worth mentioning that in the embodiment, the first threshold value may be greater than, equal to, or less than the second threshold value.

For example, the sensed light of the first wavelength may be blue light, the sensed light of the second wavelength may be green light, and the light-emitting component LD1 may emit red light. When the intensity of at least one of the blue light and the green light is too strong, the pixel circuit 300 can increase the brightness of the light-emitting component LD1 to achieve a color balance effect.

It is worth mentioning that in other embodiments of the disclosure, a larger number of light sensors can be disposed in the pixel circuit, which can be configured to detect more segments of ambient light, or to detect more sensed lights of different wavelengths.

Figure 4A:
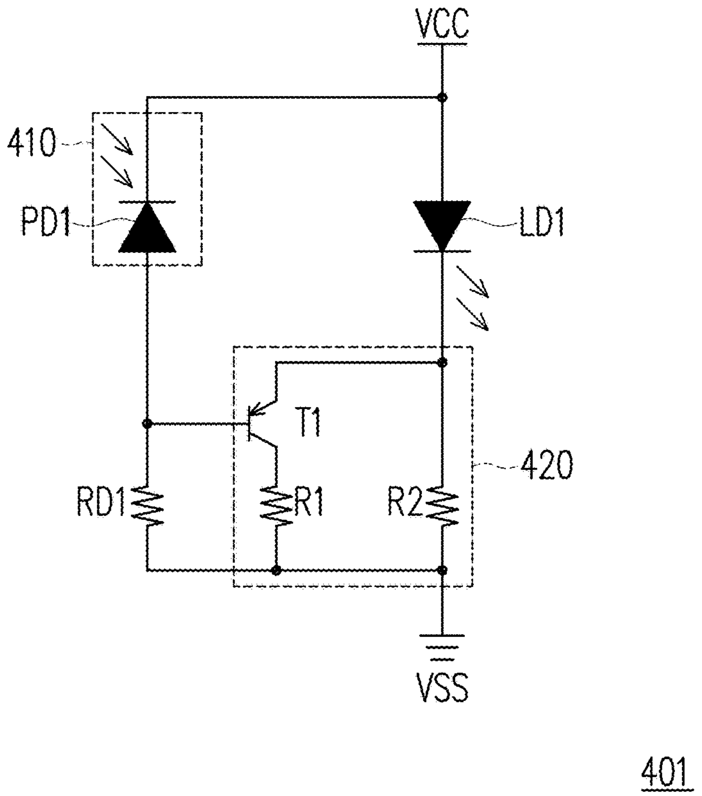
FIG. 4A and FIG. 4B are schematic diagrams respectively illustrating different implementations of a pixel circuit according to another embodiment of the disclosure.
Figure 4B:
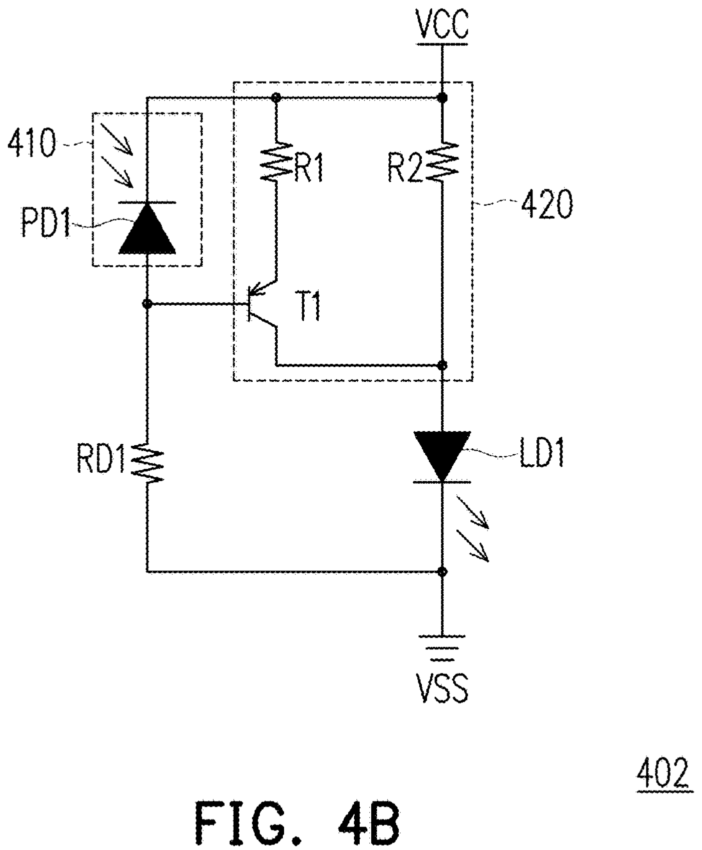

Referring to FIG. 4A and FIG. 4B, FIG. 4A and FIG. 4B are schematic diagrams respectively illustrating different implementations of a pixel circuit according to another embodiment of the disclosure. In FIG. 4A, a pixel circuit 401 includes a light sensor 410, a variable resistor 420, the light-emitting component LD1, and a resistor RD1. The variable resistor 420 includes the transistor T1 and resistors R1 and R2. The pixel circuit 401 is similar to the pixel circuit 200. For the same parts, reference can be made to the description of the embodiment in FIG. 2 and therefore will not be repeated here. The difference is that the pixel circuit 401 further includes the resistor RD1 coupled between the anode of the photo diode PD1 and the reference voltage VSS. The resistor RD1 is used as a pull-down resistor to pull down the voltage on the control terminal of the transistor T1 to the reference voltage VSS when the photo diode PD1 is turned off, and ensure that the low-voltage transistor T1 can be turned off.

A pixel circuit 402 of FIG. 4B is a complementary type of the pixel circuit 401 of FIG. 4A. The variable resistor 420 and the light-emitting component LD1 of the pixel circuit 402 are coupled to the operation voltage VCC and the reference voltage VSS in sequence, and have the opposite coupling sequence to the variable resistor 420 and the light-emitting component LD1 of the pixel circuit 401.

Figure 5A:
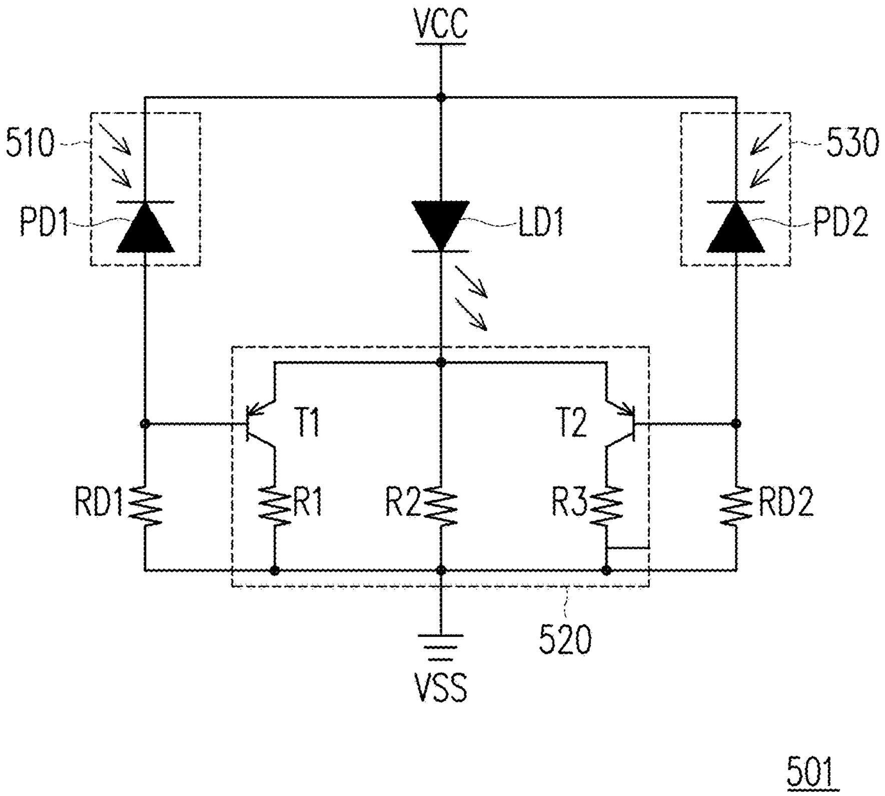
FIG. 5A and FIG. 5B are schematic diagrams respectively illustrating different implementations of a pixel circuit according to another embodiment of the disclosure.
Figure 5B:
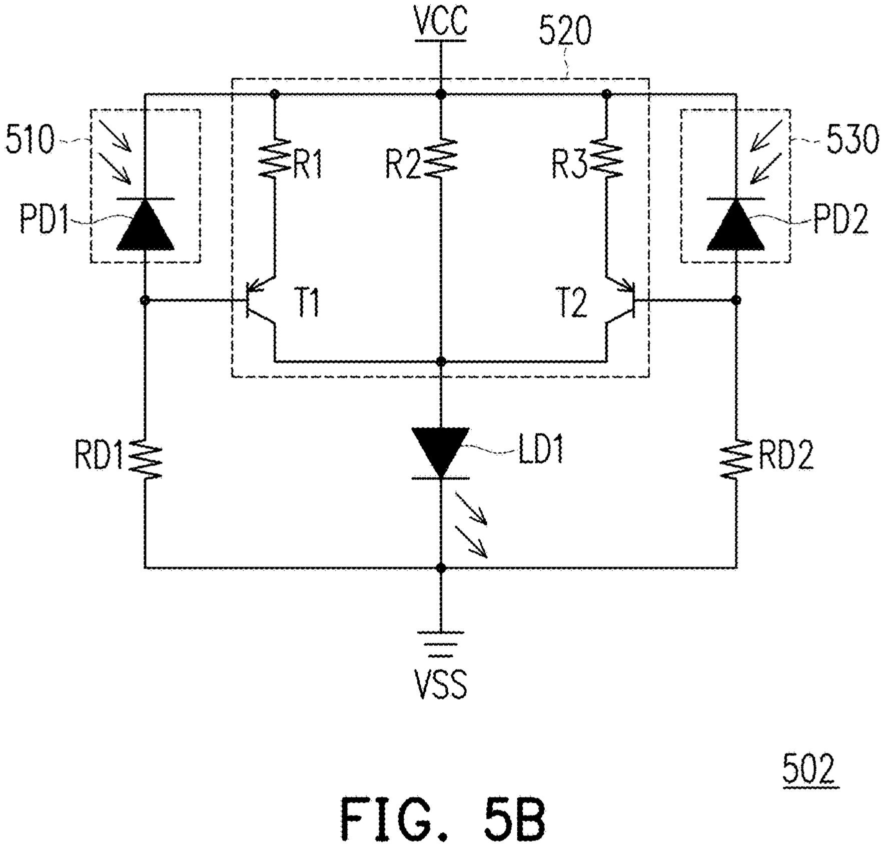

Referring to FIG. 5A and FIG. 5B, FIG. 5A and FIG. 5B are schematic diagrams respectively illustrating different implementations of a pixel circuit according to another embodiment of the disclosure. In FIG. 5A, a pixel circuit 501 includes light sensors 510 and 530, a variable resistor 520, the light-emitting component LD1, and resistors RD1 and RD2. The variable resistor 520 includes the transistors T1 and T2 and the resistors R1, R2, and R3. The pixel circuit 501 is similar to the pixel circuit 300. For the same parts, reference can be made to the description of the embodiment in FIG. 3 and therefore will not be repeated here. The difference is that the pixel circuit 501 also includes the resistor RD1 coupled between the anode of the photo diode PD1 and the reference voltage VSS, and the resistor RD2 coupled between the anode of the photo diode PD2 and the reference voltage VSS. The resistors RD1 and RD2 are used as pull-down resistors. When the photo diodes PD1 and PD2 are turned off, the resistors RD1 and RD2 are configured to pull down the voltage on the control terminals of the transistors T1 and T2 to the reference voltage VSS respectively, and ensure that the low-voltage transistors T1 and T2 can be turned off.

A pixel circuit 502 of FIG. 5B is a complementary type of the pixel circuit 501 of FIG. 5A. The variable resistor 520 and the light-emitting component LD1 of the pixel circuit 502 are coupled to the operation voltage VCC and the reference voltage VSS in sequence, and have the opposite coupling sequence to the variable resistor 520 and the light-emitting component LD1 of the pixel circuit 501.

Figure 6:
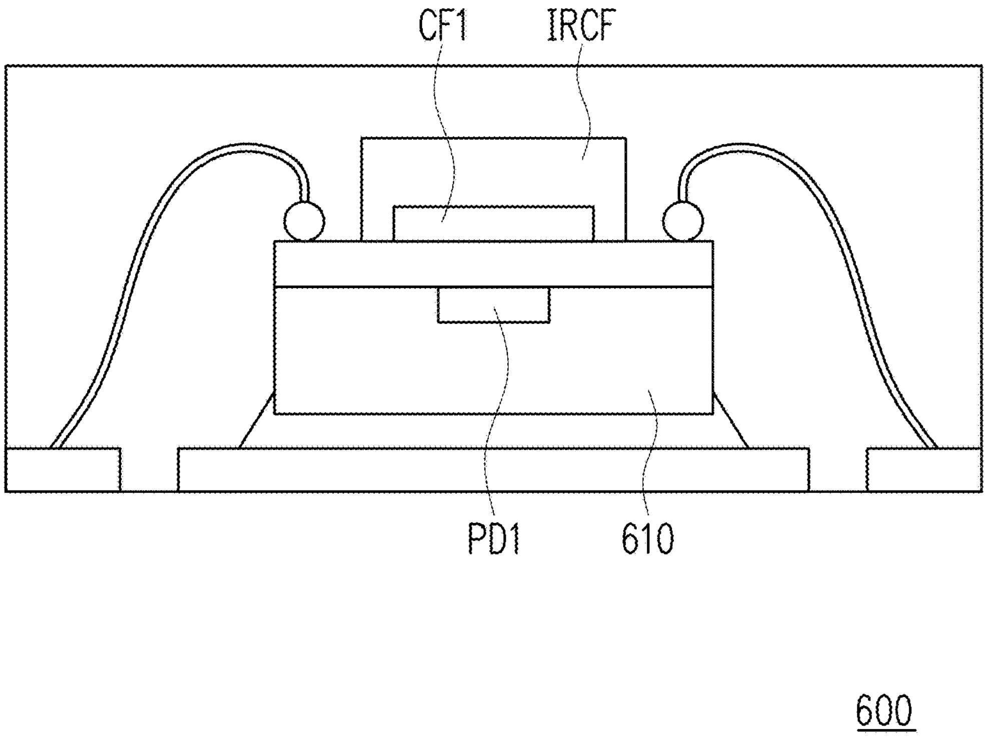
FIG. 6 is a cross-sectional diagram of a structure of a light sensor according to an embodiment of the disclosure.

Referring to FIG. 6, FIG. 6 is a cross-sectional diagram of a structure of a light sensor according to an embodiment of the disclosure. In FIG. 6, in a light sensor 600, the photo diode PD1 may be disposed in a base 610. A color filter CF1 may cover the base 610 and completely cover the top of the photo diode PD1. The light sensor 600 also has an infrared light filter IRCF. The infrared light filter IRCF covers the outside of the color filter CF1 to filter out infrared light in the environment, thereby ensuring the accuracy of light sensing of the photo diode PD1.

Figure 7:
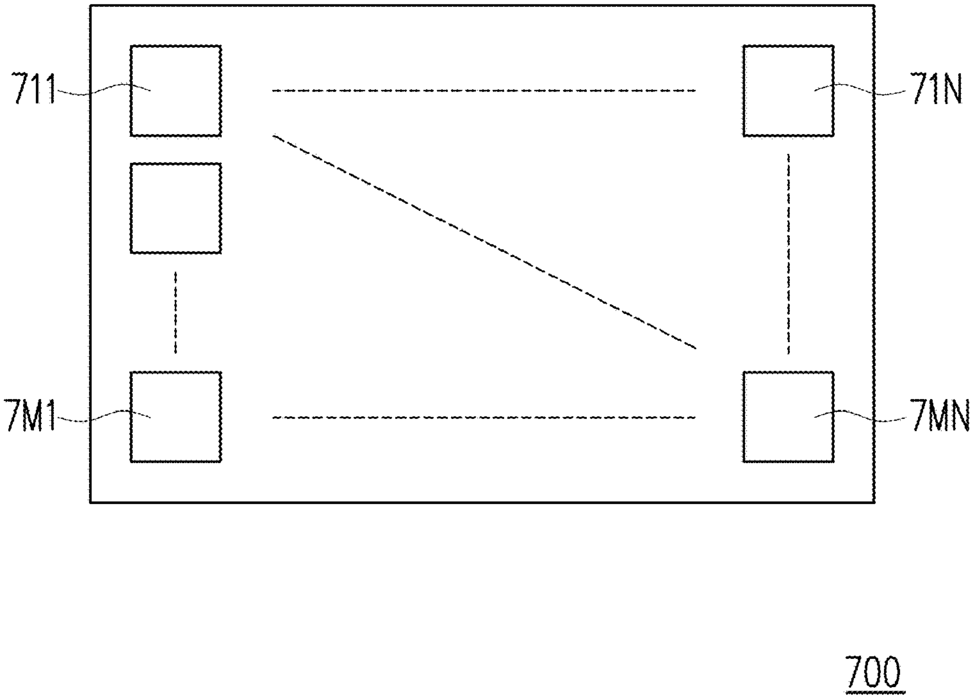
FIG. 7 is a schematic diagram of a display device according to an embodiment of the disclosure.

Referring to FIG. 7, FIG. 7 is a schematic diagram of a display device according to an embodiment of the disclosure. A display device 700 includes a plurality of pixel circuits 711 to 7MN. Each of the pixel circuits 711 to 7MN can be implemented using the pixel circuits of the aforementioned embodiments and implementations. The pixel circuits 711 to 7MN can be arranged in an array and configured to provide a display image.

To sum up, the pixel circuit of the disclosure is disposed with a light sensor. The light sensor provides the control voltage according to the intensity of the sensed light, and adjusts the resistance value provided by the variable resistor through the control voltage. By adjusting the resistance value, the driving current of the light-emitting component is adjusted, thereby adjusting the brightness of the light-emitting component. In this way, the impact of ambient light on the display screen generated by the display device can be effectively reduced to maintain the display quality of the display screen.

What is claimed is:

1. A pixel circuit, comprising:

a light-emitting component;

a first light sensor, configured to receive a first operation voltage and provide a first control voltage according to an intensity of a first sensed light; and a variable resistor, coupled in series with the light-emitting component between a second operation voltage and a reference voltage, and configured to adjust a resistance value provided therefrom according to the first control voltage so as to adjust a current value of a driving current flowing through the light-emitting component, wherein the first light sensor comprises a first photo diode, a cathode of the first photo diode receives the first operation voltage, and an anode of the first photo diode provides the first control voltage, wherein the variable resistor comprises:

a first transistor and a first resistor, wherein the first transistor and the first resistor are coupled in series between the light-emitting component and the second operation voltage, or the first transistor and the first resistor are coupled in series between the light-emitting component and the reference voltage, and a control terminal of the first transistor is configured to receive the first control voltage; and a second resistor, coupled in parallel with a circuit string formed by the first transistor and the first resistor.

2. The pixel circuit according to claim 1, wherein when the intensity of the first sensed light is greater than a first threshold value, the first light sensor is turned on, so that the first control voltage is increased to a first voltage value.

3. The pixel circuit according to claim 2, wherein the variable resistor decreases the resistance value to a first resistance value according to the first control voltage of the first voltage value so as to increase the current value of the driving current flowing through the light-emitting component.

4. The pixel circuit according to claim 2, wherein when the intensity of the first sensed light is less than a second threshold value, the first light sensor is turned off, so that the first control voltage is decreased to a second voltage value.

5. The pixel circuit according to claim 4, wherein the variable resistor increases the resistance value to a second resistance value according to the first control voltage of the second voltage value so as to decrease the current value of the driving current flowing through the light-emitting component.

6. The pixel circuit according to claim 1, further comprising:

a second light sensor, configured to receive the first operation voltage and provide a second control voltage according to the intensity of the first sensed light, wherein the variable resistor further adjusts the resistance value provided therefrom according to the second control voltage.

7. The pixel circuit according to claim 6, wherein the second light sensor comprises a second photo diode, a cathode of the second photo diode receives the first operation voltage, and an anode of the second photo diode provides the second control voltage.

8. The pixel circuit according to claim 7, wherein the variable resistor comprises:

a second transistor and a third resistor, wherein the second transistor and the third resistor are coupled in series between the light-emitting component and the second operation voltage, or the second transistor and the third resistor are coupled in series between the light-emitting component and the reference voltage, and a control terminal of the second transistor is configured to receive the second control voltage.

9. The pixel circuit according to claim 8, further comprising:

a fourth resistor, coupled between the cathode of the first photo diode and the reference voltage.

10. The pixel circuit according to claim 9, further comprising:

a fifth resistor, coupled between the cathode of the second photo diode and the reference voltage.

11. The pixel circuit according to claim 7, wherein when the intensity of the first sensed light is greater than a second threshold value, the second light sensor is turned on, so that the second control voltage is increased to the first voltage value, and the second threshold value is greater than the first threshold value.

12. The pixel circuit according to claim 11, wherein the variable resistor further decreases the resistance value to a second resistance value according to the second control voltage of the first voltage value so as to further increase the current value of the driving current flowing through the light-emitting component, and the second resistance value is less than the first resistance value.

13. The pixel circuit according to claim 1, further comprising:

a second light sensor, configured to receive the first operation voltage and provide a second control voltage according to an intensity of a second sensed light, wherein the variable resistor further adjusts the resistance value provided therefrom according to the second control voltage, wherein the first sensed light has a first wavelength, the second sensed light has a second wavelength, and the first wavelength and the second wavelength are different.

14. The pixel circuit according to claim 13, wherein the first light sensor comprises a first photo diode and a first color filter, the second light sensor comprises a second photo diode and a second color filter, the first color filter is disposed between paths through which the first photo diode receives the first sensed light, and the second color filter is disposed between paths through which the second photo diode receives the second sensed light.

15. A display device, comprising:

a plurality of pixel circuits according to claim 1, wherein the pixel circuits are arranged in an array and configured to provide a display image.

* * * * *